United States Patent [19]

Gurrieri

[11] Patent Number: 5,559,386
[45] Date of Patent: Sep. 24, 1996

[54] HIGH EFFICIENCY SALIENT POLE RELUCTANCE SYNCHRONOUS MOTOR

[75] Inventor: Giorgio Gurrieri, Ragusa, Italy

[73] Assignee: Giovanni Torti, Milan, Italy; a part interest

[21] Appl. No.: 324,745

[22] Filed: Oct. 18, 1994

[30] Foreign Application Priority Data

Oct. 21, 1993 [IT] Italy ................... RG93A0007

[51] Int. Cl.⁶ ................................. H02K 17/16
[52] U.S. Cl. ................ 310/211; 310/162; 310/269
[58] Field of Search ..................... 310/162, 163, 310/168, 169, 172, 181, 193, 211, 269

[56] References Cited

U.S. PATENT DOCUMENTS

| | | | |
|---|---|---|---|
| 3,375,385 | 3/1968 | Young | 310/211 |
| 3,634,707 | 1/1972 | Tillner | 310/172 |
| 4,358,698 | 11/1982 | Peterson et al. | 310/269 X |
| 4,720,647 | 1/1988 | Plumer | 310/211 X |
| 4,885,495 | 12/1989 | Sisk | 310/269 X |
| 4,943,746 | 7/1990 | Scherzinger et al. | 310/269 X |
| 4,998,032 | 3/1991 | Burgbacher | 310/193 |
| 5,122,697 | 6/1992 | Horst | 310/181 |
| 5,138,213 | 8/1992 | Sottek | 310/269 |
| 5,239,217 | 8/1993 | Horst | 310/168 X |
| 5,418,415 | 5/1995 | Ishizaki | 310/162 |

Primary Examiner—Mark O. Budd
Attorney, Agent, or Firm—Bucknam and Archer

[57] ABSTRACT

A high efficiency salient pole reluctance synchronous motor comprises a rotor and at least two poles having polar surfaces with a substantially constant gap through the central region thereof and increasing toward the side regions thereof, so that the gap δm, measured in the central region, and the gap δM measured on the pole horns, meet the relationship $$\frac{\delta M}{\delta m} \geq 6.$$

In the rotor there is provided a cage secondary assembly which is shorted by front rings.

8 Claims, 4 Drawing Sheets

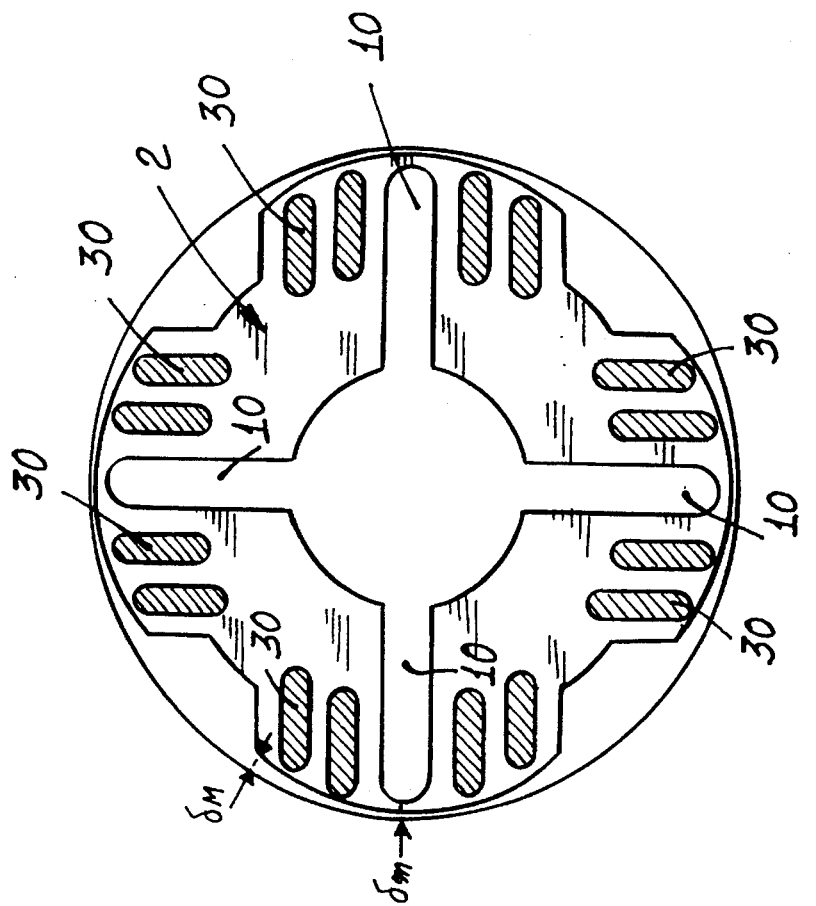
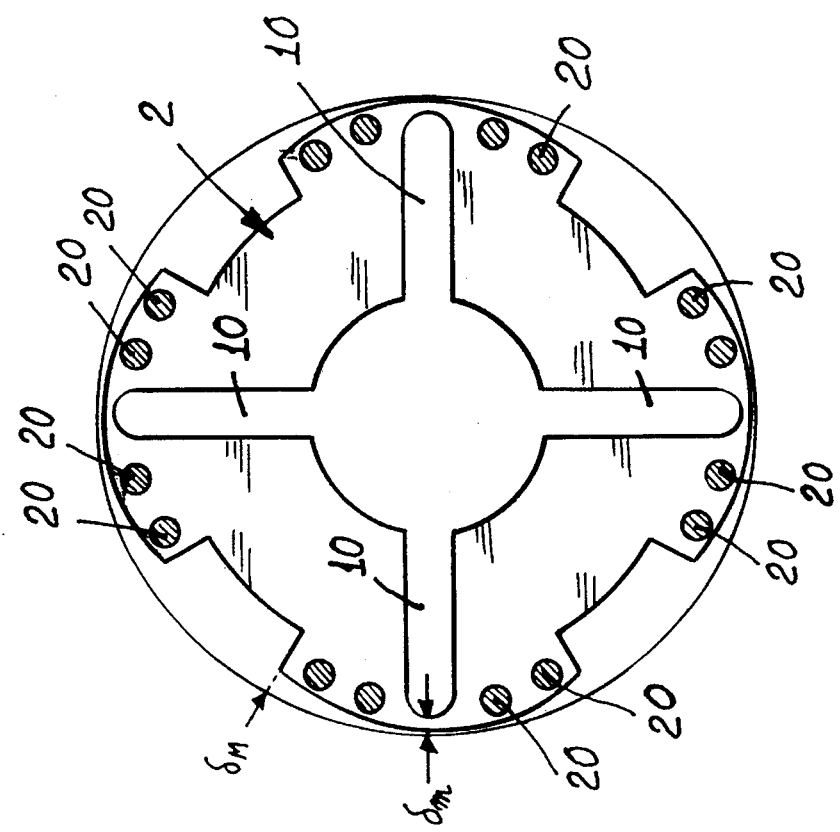

HIGH EFFICIENCY SALIENT POLE RELUCTANCE SYNCHRONOUS MOTOR

BACKGROUND OF THE INVENTION

The present invention relates to a high efficiency salient pole reluctance synchronous motor.

As is known, a reluctance synchronous motor is an electric motor having an induction polarized rotor, which is started as an asynchronous motor, in order to operate as a synchronous motor at a rated operating speed.

Such an electric motor, which is very simple for the construction standpoint, has the drawback that it has a comparatively low efficiency and can not be used for high power applications.

Another drawback, moreover, is that the above mentioned motors, which are driven through frequency converters, can be used as drives in adjustable speed systems, but with loads having a small moment of inertia because of the difficulties encountered by said motors for overcoming the inertial torques generated during the acceleration of said motors.

Such a problem is further compounded as the motor must be started under load in a direct manner, that is without providing frequency converters and at full voltage.

In fact, in such a case, the starting time is very short and, even under a small moment of inertia load, there are generated inertial torques which can not be practically overcame by the motor.

SUMMARY OF THE INVENTION

Accordingly, the aim of the present invention is to solve the above mentioned problem, by providing a salient pole reluctance synchronous motor which has a high efficiency and, moreover, is adapted to overcome high inertial or starting torques.

Within the scope of the above mentioned aim, a main object of the present invention is to provide such a reluctance synchronous motor which can start even against a comparatively high resisting torque.

Another object of the present invention is to provide such a synchronous motor which has a very high speed response to acceleration and deceleration commands applied to said motor.

Yet another object of the present invention is to provide such a synchronous motor which can satisfactory operate as an asynchronous motor when a peak load is applied to said motor and which, moreover, is adapted to resume its operation as a synchronous motor as the peak load is removed therefrom.

Yet another object of the present invention is to provide such a synchronous motor which, owing to its specifically designed construction, is very reliable and safe in operation.

According to one aspect of the present invention, the above mentioned aim and objects, as well as yet other objects, which will become more apparent hereinafter, are achieved by a high efficiency salient pole reluctance synchronous motor, characterized in that said motor comprises a rotor and at least two poles, having pole surfaces with a gap which is substantially constant in a central region thereof, and increases toward side regions thereof, so that said gap δm, measured in said central region, and said gap δM measured on pole horns of said motors meet a relationshi $$\frac{\delta M}{\delta m} \geq 6,$$

in said rotor there being moreover provided a cage secondary assembly which is shorted by front rings.

BRIEF DESCRIPTION OF THE DRAWINGS

Further characteristics and advantages of the present invention will become more apparent hereinafter from the following detailed disclosure of a preferred, though not exclusive, embodiment, of a high efficiency salient pole reluctance synchronous motor which is illustrated, by way of an indicative, but not limitative, example, in the accompanying drawings, where:

FIG. 2 illustrates, in cross section, a first embodiment of the rotor of the synchronous motor;

FIG. 3 is a cross-sectional view illustrating another embodiment of the rotor of the synchronous motor;

DESCRIPTION OF THE PREFERRED EMBODIMENTS

With reference to the number references of the figures of the accompanying drawings, the high efficiency salient pole reluctance synchronous motor according to the invention, which has been generally indicated at the reference number 1, comprises a rotor 2 which, in this embodiment, includes four poles but which, if desired, can also comprise any other suitable number of poles.

A first main feature of the present invention is that each pole is provided with a central region, in which the gap is substantially constant, and two side regions, in which the gap quickly increases.

In particular, from experimental tests, it has been found that very good results are achieved by setting a ratio between the maximum gap δM, provided at the pole horns, and the minimum gap δm, provided at said central region, having a value meeting the relationshi $$\frac{\delta M}{\delta m} \geq 6.$$

Moreover, in order to improve the operating characteristics of the subject reluctance motor, there are provided flux locking or barring slots 10, which are substantially diametrically extended and lay on the rotor poles through a depth which substantially extends through the overall pole.

Such a provision has provided a substantial increase of the motor efficiency and power factor.

In order to further increase the motor torque, so as to easily overcome the inertial torque occurring during the motor acceleration step, it has been found that optimal results where achieved by providing a shorted secondary assembly, comprising a cage, either of a simple or of a double type, provided with short ring arranged at the front thereof.

Figure 5:
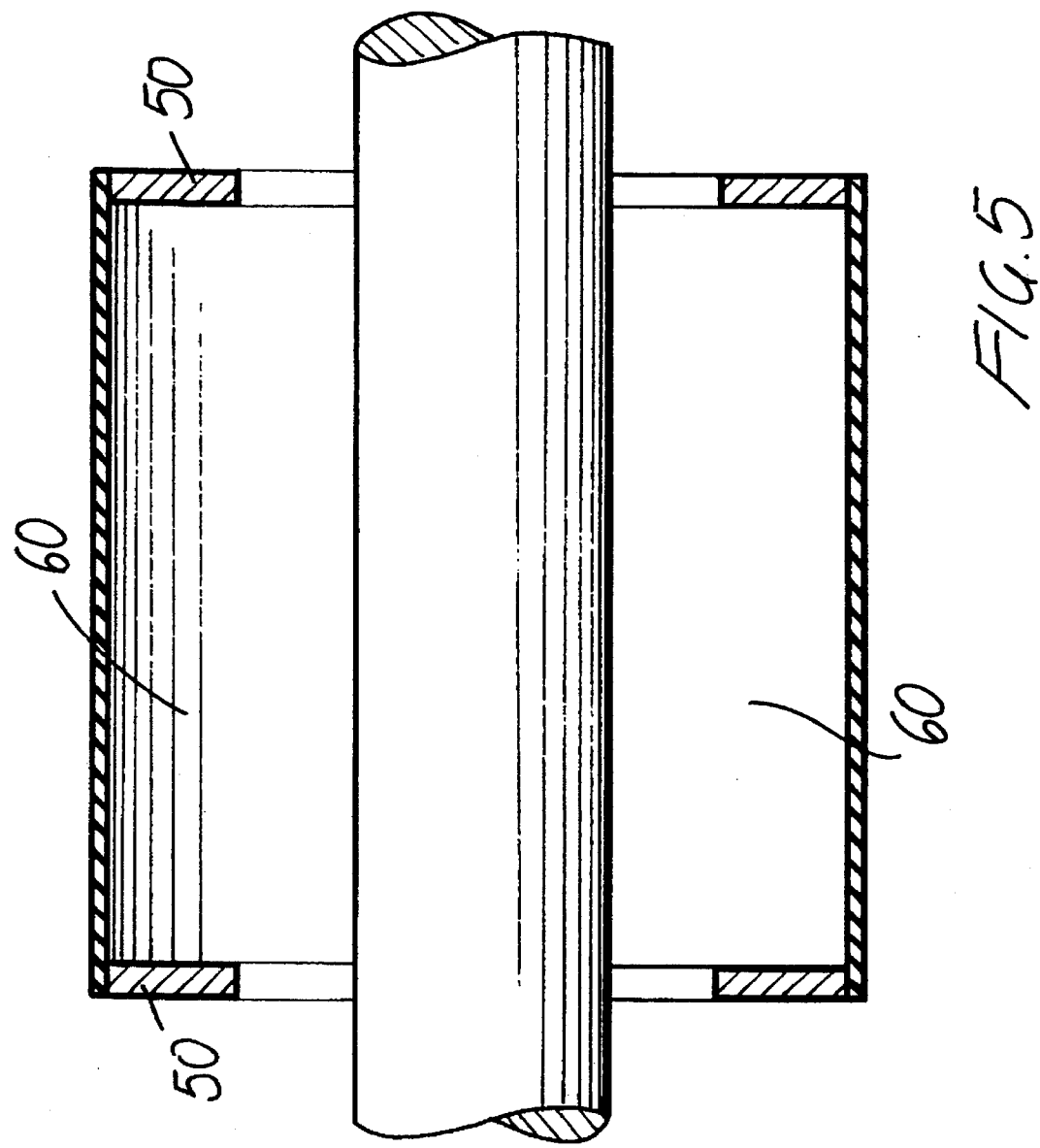
FIG. 5 illustrates a rotor according to the present invention which, however, has been made starting from a solid iron material with two copper or aluminium rings assembled on the front portions.

In the embodiment shown in FIG. 5 the rotor cage comprises two solid iron segments 60 in which the poles are separated by the barring or locking slots 10 and front rings 50 which are assembled so as to closely contact the solid iron material, a perfect electric connection being possibly assured by suitable weldments. Each of these segments is parallel to the rotary axis and through each segment will flow respective currents which will be shorted through the rings so as to provide a cage effect suitable for operating the motor as an asynchronous motor in the acceleration and deceleration steps, even if with a reduced performance with respect to a like motor provided with a proper cage.

As shown in FIG. 2, there is provided a cage in which the rod 20, usually made of copper or by die-casting, have a circular cross-section shape.

In the embodiment being shown in FIG. 3, there is provided a rotor the cages of which are provided with rods 30 which have a substantially elongated rectangular shape, with rounded end surfaces.

The cage, which constitute a shorted secondary assembly, actually characterizes the asynchronous operation of the motor during the acceleration and deceleration steps.

Moreover, the embodiment shown in FIG. 3 is specifically designed for operating as a reluctance motor because of the double action which can be provided thereby.

In fact, it provides the motor, during an acceleration step, with the properties of an asynchronous motor whereas during the rated operation (synchronous operation), because the arrangement of the rods which extend substantially parallel to the polar axes, it increases the difference existing between the cross reluctance and axial reluctance, with a consequent increase of the maximum torque with respect to the rated torque.

Figure 1:
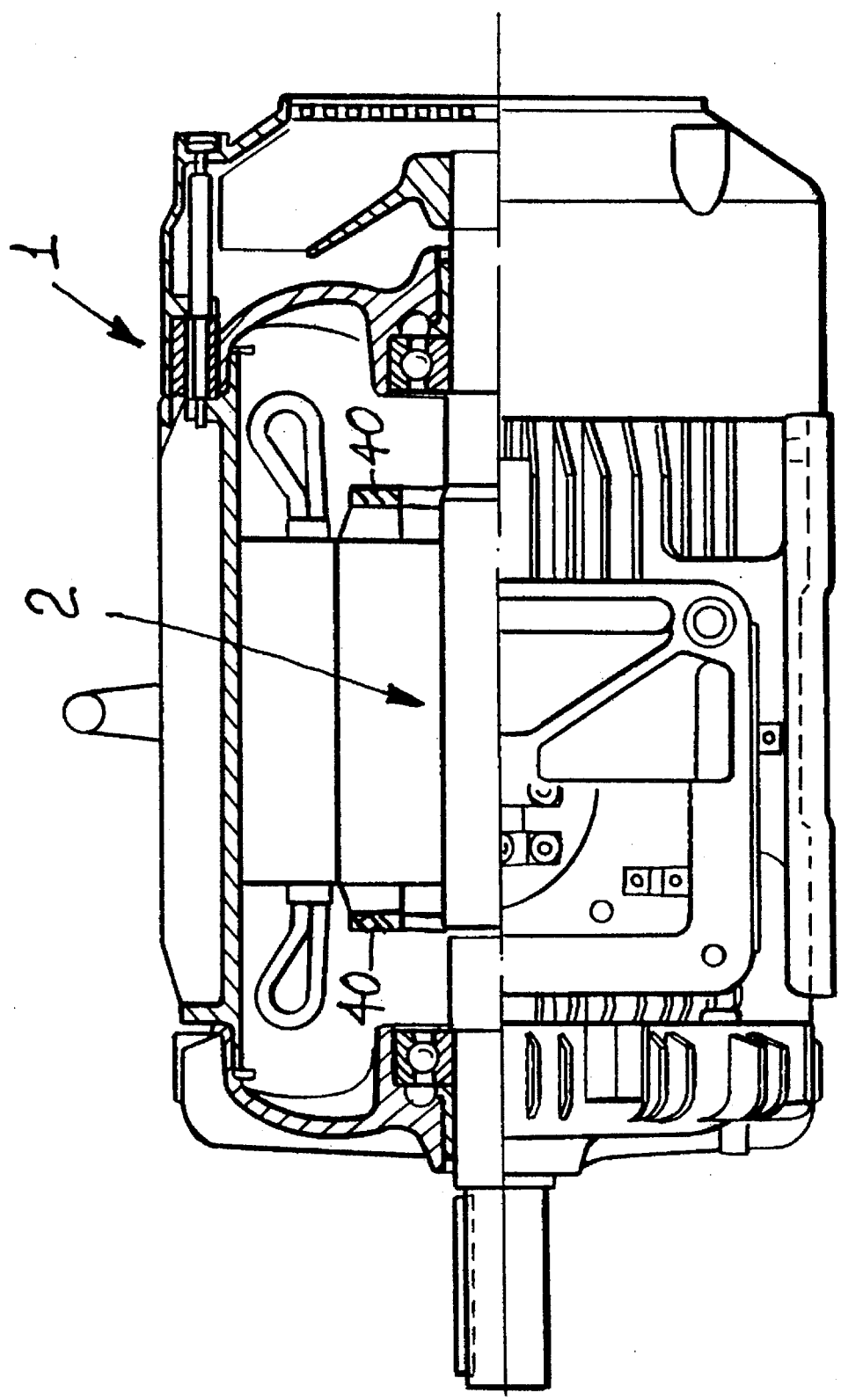
FIG. 1 is a broken-away schematic view illustrating a reluctance synchronous motor according to the present invention.
Figure 4:
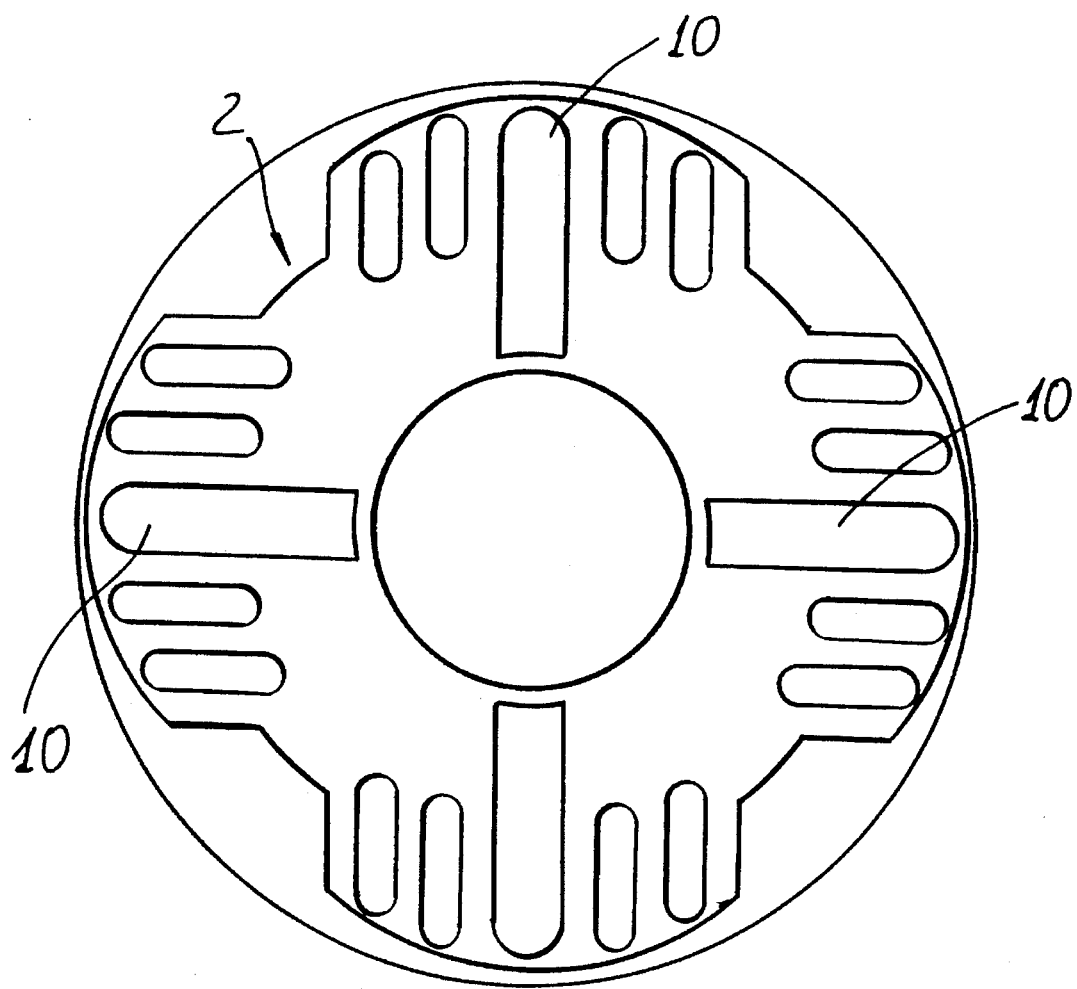
FIG. 4 is a further cross-sectional view illustrating a rotor having a cage secondary assembly, with flux locking slots including two interruption points.

As shown in FIG. 4, in the rotor 2 herein shown the locking or barring slots 10 are partially made.

The interruptions of the above mentioned slots can be provided at different positions from the shown positions, at the most suitable regions.

In this connection, it should be moreover apparent that the subject high efficiency salient pole reluctance synchronous motor is characterized in that it is provided with a rotor 2 which has either a simple or double-cage secondary assembly.

Said cage, according to a further feature of the invention, is provided with rods or bars 20, 30, of any suitable configuration, which are distributed through the polar region.

As a theoretical consideration, it is possible to state that in a reluctance motor, provided with a shorted secondary assembly, during the starting step thereof, through the single rods or bars 20, 30 of the cage of the rotor 2 there are generated reaction currents which, as it occurs in an asynchronous motor, will provide, in cooperation with the stator currents, a torque which will depend on the slip and the constructional characteristics of the motor.

The number of the rods or bars 20, 30 and the size thereof, as in an asynchronous motor, will depend on the performance to be achieved during the motor starting step, i.e. short current, starting torque, maximum torque and slip value at which is generated the maximum torque.

With the rotor 2 provided with a cage and with the poles having the above mentioned features, the operation of the motor is greatly improved.

Moreover, the motor 1 will have a very high response capability with respect to the speed commands, both in acceleration and in deceleration.

Another important feature, which is actually novel for a reluctance motor, is that, on a load abrupt peak condition, susceptible to overcome the maximum torque which can be provided by the motor in a synchronous operation, but not that which the motor can provide in a asynchronous operation, the motor will be brought to an out of step condition.

In such a case, the subject motor 1 will automatically fit the load, by operating as an asynchronous motor through the overall duration of the peak load, and it will quickly be recovered to its synchronous operation, as the peak load is removed.

This feature, which is obviously held also in the directly started systems, in which the motor 1 must operate with a constant speed, will improve the stability properties of the system from the value represented by the maximum synchronous torque to the value represented by the maximum asynchronous torque.

In particular, the cage can be made of copper bars or rods including front rings 40, also made of copper, both in the laminated construction rotors and in the solid construction rotors which latter are made by casting methods. For laminated rotors, it is also possible to made the cage by a die-casting method.

Owing to the above disclosed features, it is afforded the possibility of making a reluctance synchronous motor which can be used in those systems in which there is required a precisely constant running speed as well as in systems in which abrupt speed variations can occur, and in systems in which the motor speed must be adjusted in a very accurate manner.

The invention as disclosed is susceptible to several modifications and variations, all of which will come within the scope of the inventive idea.

Moreover, all of the details can be replaced by other technically equivalent elements.

In practicing the invention, the used materials, as well as the contingent size and shapes can be any, depending on requirements.

I claim:

1. A high efficiency salient pole reluctance synchronous motor, comprising a rotor and at least two poles, each pole having a central region with a gap which is substantially constant and two side regions in which said gap quickly increases, so that said gap δm, measured in said central region, and said gap δM measured on pole horns of said motors meet a relationshi $$\frac{\delta M}{\delta m} \geq 6,$$

in said rotor there being moreover provided a cage secondary assembly which is shorted by front rings, and wherein in each said pole is formed a flux barring slot which extends substantially diametrically through said pole.

2. A high efficiency salient pole reluctance synchronous motor, according to claim 1, wherein said rotor is provided with a simple cage secondary assembly.

3. A high efficiency salient pole reluctance synchronous motor, according to claim 1, wherein said rotor is provided with a double cage secondary assembly.

4. A reluctance synchronous motor, according to claim 1, wherein said cage is provided with cage rods having a circular cross-section and evenly distributed on the poles.

5. A reluctance synchronous motor, according to claim 1, wherein said cage is provided with elongated rectangular cross-section rods having rounded small faces.

6. A reluctance synchronous motor, according to claim 5, wherein said rectangular cross-section rods are arranged substantially parallel to a polar axis of said motor.

7. A reluctance synchronous motor, according to claim 1, wherein said cage is provided with a plurality of cage rods distributed through the polar region.

8. A reluctance synchronous motor, according to claim 1, said motor being made of a solid iron material, and being provided with copper or aluminum front rings and using, as said cage rods, the same segments into which each said pole is divided by said flux barring slot.

* * * * *